United States Patent [19]

Ferenc

[11] Patent Number: 4,866,329
[45] Date of Patent: Sep. 12, 1989

[54] WIDE ANGLE WARNING LIGHT

[75] Inventor: Robert A. Ferenc, Middletown, Conn.

[73] Assignee: Whelen Technologies, Inc., Chester, Conn.

[21] Appl. No.: 239,203

[22] Filed: Aug. 31, 1988

Related U.S. Application Data

[63] Continuation of Ser. No. 487,033, Apr. 21, 1983, Pat. No. 4,792,717.

[51] Int. Cl.$^4$ ............................................... H01J 5/16
[52] U.S. Cl. .................................... 313/113; 313/116; 362/308; 362/327
[58] Field of Search ............... 313/110, 111, 113, 116; 362/296, 308, 327, 328

[56] References Cited

U.S. PATENT DOCUMENTS

| | | | |
|---|---|---|---|
| D. 209,539 | 12/1967 | Pitkjaan | D48/32 |
| D. 217,386 | 4/1970 | Muneoka | D48/32 |
| D. 282,010 | 12/1985 | Ferenc | D26/28 |
| 3,348,094 | 10/1967 | Smith | 313/113 |
| 4,276,584 | 6/1981 | Ichikawa | 362/308 |
| 4,310,773 | 1/1982 | Zukowski | 313/594 X |
| 4,792,717 | 12/1988 | Ferenc | 313/113 |

FOREIGN PATENT DOCUMENTS 767519 2/1957 United Kingdom ................ 313/113
1289841 9/1972 United Kingdom .

Primary Examiner—Kenneth Wieder
Attorney, Agent, or Firm—Chilton, Alix & Van Kirk

[57] ABSTRACT

A compact, wide angle light comprising a concave reflector, lens and light emitter. The lens is provided with a pluraltity of light spreaders while the reflector is comprised of a linear section, with side walls interconnected by a parabolic section, disposed between dish end sections.

15 Claims, 3 Drawing Sheets

WIDE ANGLE WARNING LIGHT

This is a continuation of co-pending application Ser. No. 487,003 filed on 4-21-83, now U.S. Pat. No. 4,792,717.

BACKGROUND OF THE INVENTION

The present invention relates to lights and, more particularly, warning lights having a wide angle radiation pattern, particularly in a single plane.

Lights employed on emergency vehicles such as police cars, ambulances, fire trucks and the like are required to produce light which is visible from all sides of the vehicle. The most common prior art vehicular mounted warning lights are dome type lights which often comprise a revolving lamp or mirror but which may comprise an xenon flash tube and cooperating cylindrically shaped lens. These prior types of lights are fairly expensive to manufacture. Further, prior art dome lights increase the overall height of the vehicle on which they are installed thus often presenting clearance problems. Naturally, it is highly desirable to provide a light which is capable of providing the required pattern of illumination while being of simple construction, economic to manufacture, easy to install and not causing an increase in vehicle height.

Accordingly, it is a principal object of the present invention to provide a warning light which produces a wide angle light pattern, particularly in a single plane.

It is a particular object of the present invention to provide a warning light which is compact, i.e., is characterized by minimum height and depth, while providing maximum intensity and illuminated area for the size of the light.

It is a further object of the present invention to provide a light which is characterized by uncomplicated construction, ease of assembly and installation and is inexpensive to manufacture.

It is an additional object of the present invention to provide a warning light particularly well suited to both installation on new vehicles and of being retrofitted on existing emergency vehicles.

Further objects and advantages of the present invention will appear hereinbelow.

SUMMARY OF THE INVENTION

In accordance with the present invention, the foregoing objects and advantages are readily obtained.

The present invention relates to a light and, more particularly, a compact wide angle light. In accordance with the present invention the light comprises a reflector, a lens adapted to be secured to the reflector and a light source mounted in the envelope defined by the reflector and lens. The lens is provided with a plurality of optical light spreaders. The lens may also be provided with a centrally located "window", i.e., a region which is optically clear and of substantially constant thickness. The reflector comprises a linear parabolic section disposed between a pair of parabolic dish ends.

BRIEF DESCRIPTION OF THE DRAWINGS

The present invention may be better understood, and its numerous objects and advantages will become apparent to those skiled in the art, by reference to the accompanying drawing wherein like reference numerals refer to like elements in the several FIGURES and in which.

DETAILED DESCRIPTION

Figure 2:
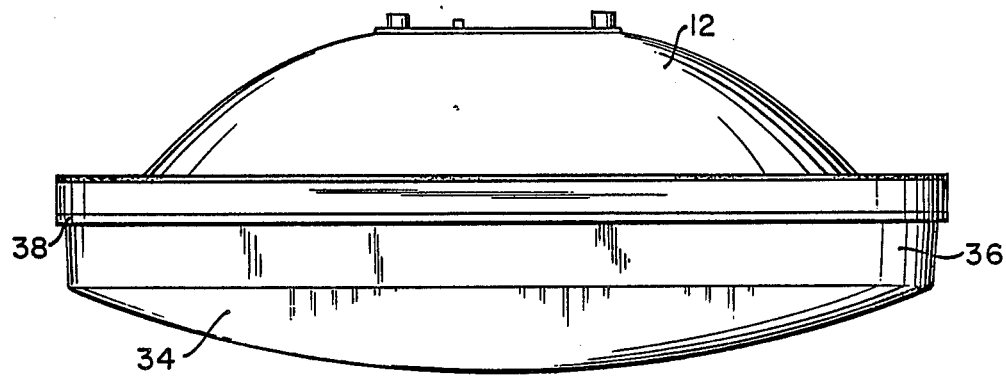
FIG. 2 is a top view of the light shown in FIG. 1.
Figure 1:
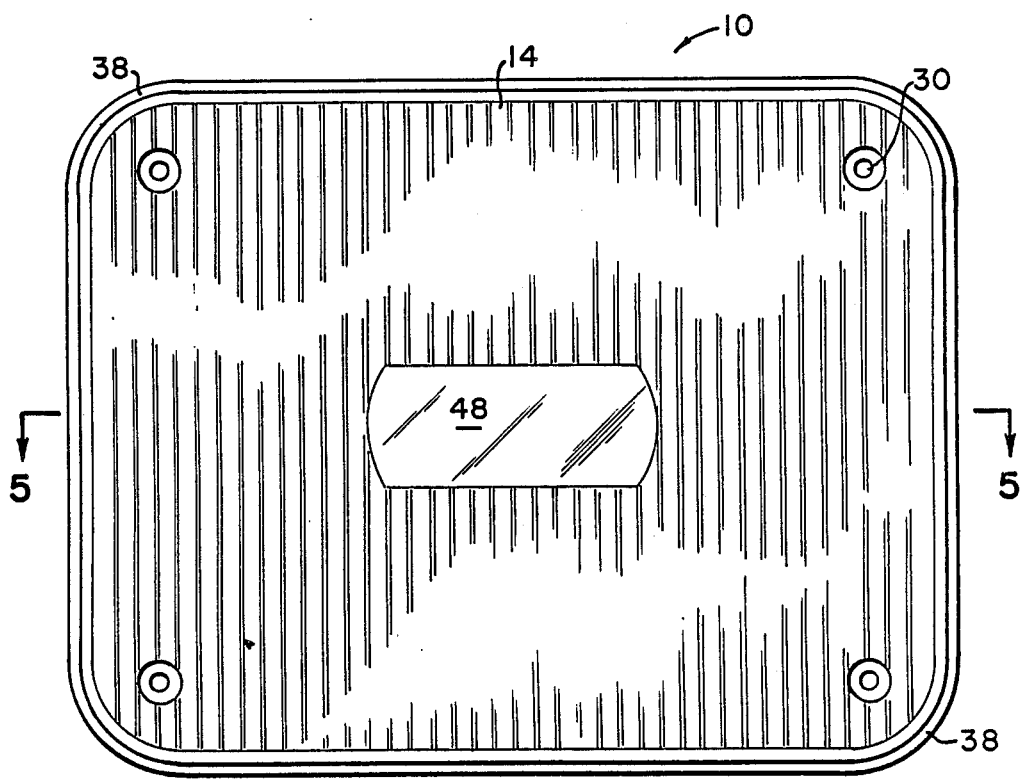
FIG. 1 is a front plan view of a warning light in accordance with the present invention.
Figure 7:
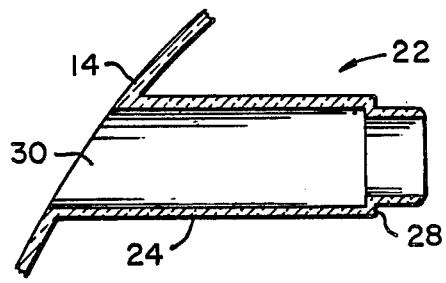
FIG. 7 is a partial sectional view of the light of FIG. 1.

Referring to the drawings, a light in accordance with the present invention is indicated generally at 10 in FIG. 1. Light 10 will, for example, be "flush" mounted in the side of an emergency vehicle immediately below the roof line. There will typically be a plurality of the lights 10 at the same height and spaced so as to provide a light emission pattern which is visible from all sides of the vehicle. Light 10 comprises a rear housing 12, which functions as a reflector, and a lens 14 which is adapted to be secured to housing 12. The housing 12, as best seen from FIG. 5, has a concave reflector portion 16 and a flanged peripheral portion 18 integrally molded to portion 16. In accordance with the preferred embodiment of the present invention, housing 12 is molded from a suitable thermoplastic material and the inner surface of portion 16 thereof is metallized to provide a reflective surface. The flanged portion 18 of housing 12 is provided with a plurality of orifices 20 which receive tubular projections 22, See FIG. 7 provided on the lens portion 14. A water seal gasket 50 is provided on the rearside of flanged portion 18.

As can best be seen in FIG. 7, the projection 22 comprises a first larger diameter portion 24 and a second smaller diameter portion 26 joined together so as to define a ridge shoulder 28 which lies flush against the surface of flanged portion 18 on reflector housing 12 when the smaller diameter portion 26 is received within the orifices 20. The reflector housing 12 and the lens 14 are, in accordance with a preferred embodiment, permanently secured together by suitable means. The light may be mounted within an opening provided in a vehicle wall by means of fasteners received in the bore 30 defined by portions 24 and 26 of projection 22. A lamp 32 is supported in housing 12, the reflector portion 16 of housing 12 having an integral socket which receives lamp 32. Lamp 32 will typically be a gaseous discharge containing xenon gas but might be a halogen lamp.

Figure 6:
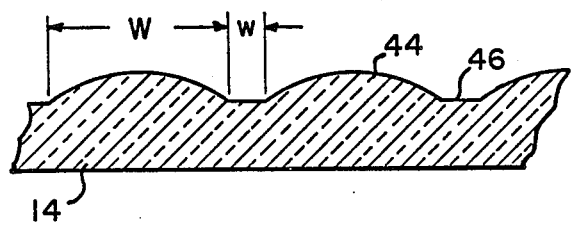
FIG. 6 is an enlarged sectional view in the direction of FIG. 5 showing details of a lens in accordance with the disclosed embodiment of the present invention.
Figure 5:
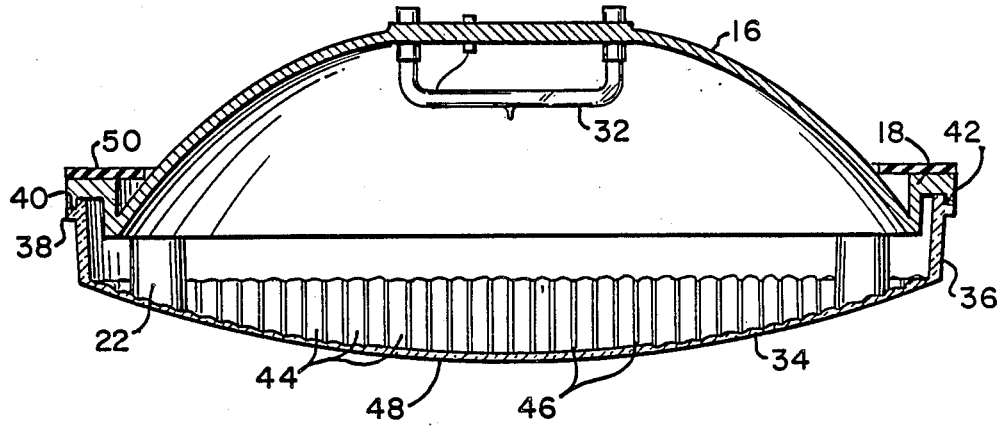
FIG. 5 is a cross-sectional view taken along line 5—5 of FIG. 1.

With reference simultaneously to FIGS. 1, 5 and 6, the details of the lens of the present invention will be discussed. The lens 14 is provided with a convex face portion 34 and a substantially rectangular edge portion 36 provided with a lip 38. The lip 38 cooperates with the edge portion 36 to define a peripheral recess 40. Recess 40 receives a lip 42 provided on the flanged portion 18 of the reflector housing 12. The projections 22 which define bore 30 are integrally molded to the convex face 34 of lens portion 14.

The convex face 34 of lens portion 14 is provided, on the surface thereof which faces the reflector, with a plurality of spacially displaced parallel spreader optic bars or bands. In accordance with the disclosed embodiment of the present invention these bands comprise elongated arcuate projections in the form of spherical surfaces 44 of width W which are separated from each other by flat areas 46 of width W. The center region of the inwardly-facing side of lens portion 14 is provided with a substantially rectangular flat window area 48. The spreaders 44 are shallow in the interest of reducing light loss while redirecting the light emitted by lamp 32 along a line which is transverse to the axes of the spreaders 44. Accordingly, the light produced by lamp 32 is visible over a much greater angle than would be the case if the spreaders 44 were not employed. The flats between the spreaders allow the passage of direct light rays with minimum attenuation. The window 48 passes, with minimum loss, light directly from lamp 32 and light directly reflected from the region of the reflector immediately surrounding the lamp.

Figure 3:
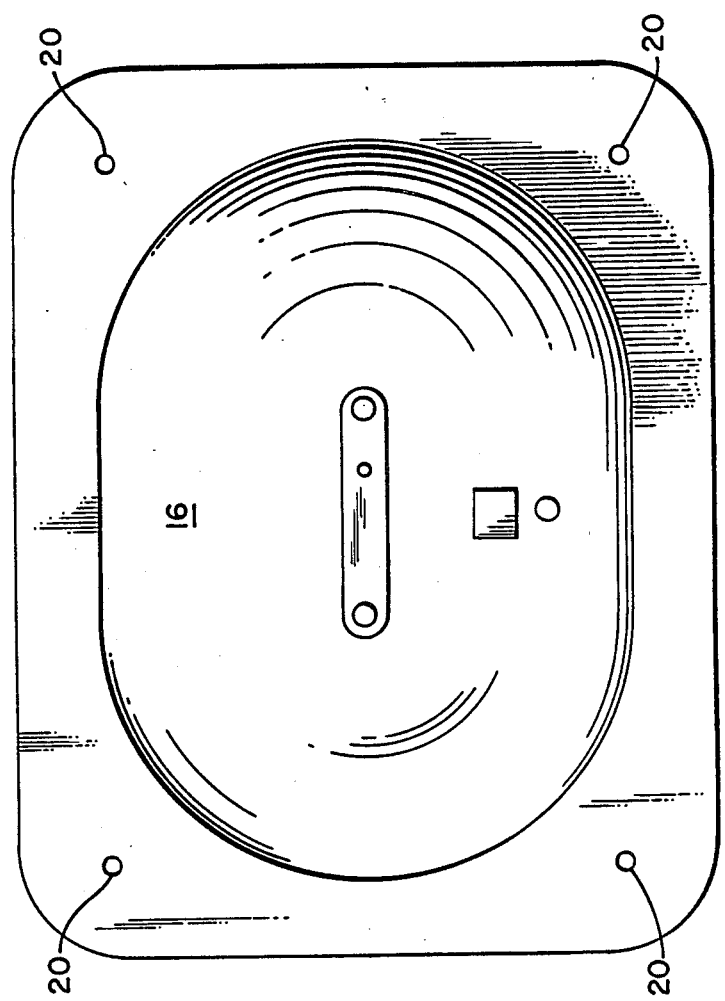
FIG. 3 is a back view of the light shown in FIG. 1.
Figure 4:
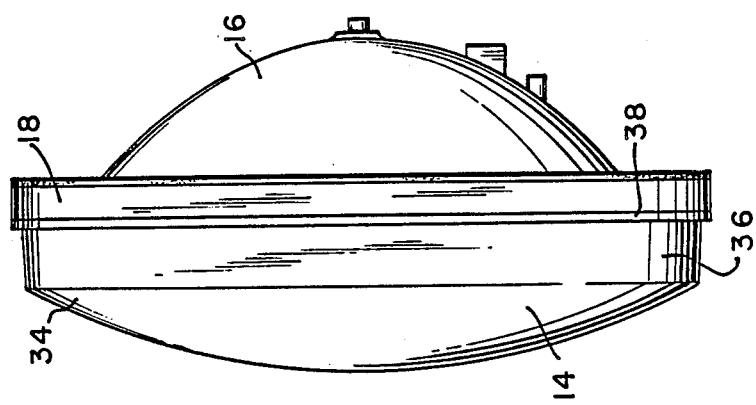
FIG. 4 is a side view of the light shown in FIG. 1.

The reflector, as may best be seen from a joint consideration of FIGS. 3 and 5, comprises a linear parabolic section disposed between a pair of parabolic dish ends, i.e., ends having concave surfaces which define portions of paraboloids of revolution about parallel axes. The intermediate linear section has a rear wall which, when viewed in cross-section and in a direction transverse to FIG. 5, defines a paraboloid having its focal point line on a straight line which intersects said axes. This arrangement results in greater reflection, off the center linear section, at higher angles than could be obtained using a conventional dish-type parabolic reflector. The greater reflection at high angles maximizes the output intensity of the light since a comparatively high percentage of the generated light passes through the window 48 and the flats between the spreaders 44, i.e., through a single medium thereby minimizing losses. This arrangement also results in a light which has a greater output intensity when compared to that which could be obtained with a conventional parabolic reflector having the same total depth. Depth is a very important consideration since the light of the present invention, for maximum utility, must be capable of installation in, but not through, the side wall of a vehicle. The parabolic dish end sections will, in the known manner, provide a very directional light pattern, i.e., light rays which are generally normal to the inner surfaces of the flats 46 of lens 14.

The present invention thus comprises a warning light having a wide angle radiation pattern which, in the disclosed embodiment, will normally be directed in a horizontal plane. The light of the present invention is characterized by minimum height and depth while the output intensity and the area of illumination is maximized for the physical size of the light. The light in accordance with the present invention is also characterized by uncomplicated construction, and thus moderate cost, and is easy to assembly and install. It is particularly noteworthy that, in the case of an emergency vehicle, the light will be installed in the vehicle wall but will not protrude into the vehicle interior. For both cosmetic reasons and to minimize wind resistance, the extension of the light outwardly from the mounting surface will be kept to a minimum, i.e., a substantially flush mounted warning light is provided. Further, the above-described light is preferably a sealed beam-type device and, when the light source is a flash tube, the present invention will become a sealed beam strobe that is disposable either entirely or in part. A light in accordance with the present invention may be installed with the aid of a single water seal gasket. This may be contrasted with prior art sealed beam-type lights which are typically comprised of seven (7) or more components including a mounting base, multiple gaskets, and separate sealed beam lamp assemblies including a reflector, a lamp with inner lens and an outer lens. It is noteworthy that a typical prior art sealed beam type of light, in addition to being expensive because of the numerous components, is characterized by a comparatively high degree of attenuation since the emitted light must successively pass through two (2) mediums of plastic or glass, i.e., the inner and outer lenses. As discussed above, in the light of the present invention the reflector is designed to maximize output intensity while keeping the depth of the assembly to a minimum and while simultaneously achieving a wide angle radiation pattern. This novel reflector is, in the preferred embodiment, made integral with the mounting member for the light.

The reflector of the present invention cooperates with a novel lens which includes spreaders for achieving a more uniform radiation pattern, the avoidance of hot spots and for redirecting the direct and reflected light. In prior lights the use of spreaders inherently produced a significant, and often unacceptable, reduction in the head-on intensity level. In the disclosed embodiment of the present invention the spreaders are separated by means of flats and the lens is provided with a centrally disposed window and the generated light will pass through only a single medium and thus be minimally attenuated. While the lens of the light of the present invention employs spreaders to achieve the desired radiation pattern, these spreaders are shallow thereby reducing losses.

It is to be understood that the invention is not limited to the illustration described and shown herein, which is deemed to be merely illustrative of the best mode of carrying out the invention, and which is susceptible of modification of form, size, arrangement of parts and details of operation. The invention rather is intended to encompass all such modifications which are within its spirit and scope as defined by the claims.

What is claimed is:
1. A wide angle light source comprising:
   means defining a reflector, said reflector defining means including:
      a first end section, said first end section having a concave reflective surface which at least in part defines a first portion of a paraboloid of revolution about a first axis, said concave reflective surface of said first end section extending inwardly from a forward edge which is at least in part arcuate;
      a second end section, said second end section having a concave reflective surface which at least in part defines a portion of a paraboloid of revolution about a second axis, said second axis being oriented generally parallelly to said first axis, said concave reflective surface of said second end section extending inwardly from a forward edge which is co-planar with the forward edge of said first end section; and
      a linear intermediate section having a concave reflective surface, said intermediate section being integral with and extending between said end sections, said intermediate section having a rear wall portion which interconnects a pair of parallel side wall portions, said rear wall portion at least in part having a profile which is a paraboloid having a focal point defining a straight line intersecting said first and second axes, said side wall portions of said intermediate section defining a pair of parallel linear forward edges which are generally co-planar with said forward edges of said first and second end sections;

a leans means adapted to be secured to said reflector defining means, said lens means and reflector-defining means cooperating to form a chamber bounded in part by said reflective surfaces; and light emitter means disposed in said chamber, said light emitter means comprising a gaseous discharge tube having a pair of leg portions and an elongated linear intermediate portion which interconnects first ends of said leg portions, said leg portions extending outwardly from said light emitter means intermediate portion to said reflector-defining means whereby said light emitter is supported from said reflector-defining means by said legs, said linear intermediate portion of said light emitter means defining an axis which is oriented generally parallel to said reflector-defining means intermediate section forward edges, said light emitter means intermediate portion axis being positioned inwardly toward said reflector means intermediate section rear wall portion with respect to the plane in which said forward edges of said reflector defining means sections lie.

2. The wide angle light source of claim 1 wherein said lens means is provided with surface irregularities which disperse light incident thereon over an angle, said lens means surface irregularities being disposed at the opposite side of said plane of said forward edges of said reflector defining means sections when compared to said light emitter means linear intermediate portion.

3. The wide angle light source of claim 2 wherein said lens means is further provided with a window portion which is free of said surface irregularities, said window portion being in registration with said reflector defining means intermediate section.

4. The wide angle light source of claim 1 wherein the side of said lens means which faces said reflector defining means has a generally concave shape.

5. The wide angle light source of claim 4 wherein said lens means is provided with surface irregularities which disperse light incident thereon over an angle.

6. The wide angle light source of claim 5 wherein said lens means is provided with a window portion which is free of said surface irregularities, said window portion being in registration with said reflector defining means intermediate section.

7. The wide angle light source of claim 3 wherein said lens means surface irregularities have an arcuate shape when viewed in cross-section and are positioned on the side of said lens means which faces said reflector defining means.

8. The wide angle light source of claim 6 wherein said lens means surface irregularities have an arcuate shape when viewed in cross-section and are positioned on the side of said lens means which faces said reflector defining means.

9. The wide angle light source of claim 3 wherein said surface irregularities are separated by flat regions.

10. The wide angle light source of claim 6 wherein said surface irregularities are separated by flat regions.

11. The wide angle light source of claim 7 wherein said surface irregularities are separated by flat regions.

12. The wide angle light source of claim 8 wherein said surface irregularities are separated by flat regions.

13. The wide angle light source of claim 3 wherein the side of said lens means which faces said reflector defining means has a generally concave shape.

14. The wide angle light source of claim 13, wherein said lens means surface irregularities have an arcuate shape when viewed in cross-section and are positioned on the side of said lens means which faces said reflector defining means.

15. The wide angle light source of claim 14 wherein said surface irregularities are separated by flat regions.

* * * * *

Disclaimer 4,866,329.—*Robert A. Ferenc,* Middletown, Conn. WIDE ANGLE WARNING LIGHT. Patent dated Sept. 12, 1989. Disclaimer filed Feb. 15, 1990, by the assignee, Whelen Technologies, Inc.

The term of this patent subsequent to December 20, 2005, has been disclaimed.
[ *Official Gazette April 24, 1990* ]

UNITED STATES PATENT AND TRADEMARK OFFICE
CERTIFICATE OF CORRECTION

PATENT NO. : B1 4,866,329

DATED : Issued: 11/12/91  Page 1 of 3

INVENTOR(S) : Robert A. Ferenc

It is certified that error appears in the above-identified patent and that said Letters Patent is hereby corrected as shown below:

<u>ON THE TITLE PAGE</u>

Section, [56] References Cited, should read as follows:

U. S. PATENT DOCUMENTS

| | | | |
|---|---|---|---|
| D. 124,016 | 2/1972 | Schneider | 362/338 |
| D. 130,745 | 12/1941 | Mausshardt | |
| D. 209,539 | 12/1967 | Pitkjaan | D48/32 |
| D. 217,386 | 4/1970 | Muneoka | D12/99 |
| D. 282,010 | 12/1985 | Ferenc | D26/28 |
| 1,465,615 | 8/1923 | Nelson | 219/347 |
| 1,480,364 | 1/1924 | Bean | 362/296 |
| 1,522,853 | 1/1925 | Bell.- | 362/333 |
| 1,739,179 | 6/1926 | Rassler | 362/336 |
| 1,889,188 | 11/1932 | Bean | 362/350 |
| 1,898,166 | 2/1933 | Bean | 362/350 |
| 2,260,894 | 10/1941 | Field | 240/7.35 |

UNITED STATES PATENT AND TRADEMARK OFFICE
CERTIFICATE OF CORRECTION

PATENT NO. : B1 4,866,329
DATED : Issued: 11/12/91          Page 2 of 3
INVENTOR(S) : Robert A. Ferenc It is certified that error appears in the above-identified patent and that said Letters Patent is hereby corrected as shown below:

| | | | |
|---|---|---|---|
| 2,475,365 | 7/1949 | Walsh | 362/343 |
| 3,348,094 | 10/1967 | Smith | 315/71 |
| 4,276,584 | 6/1981 | Ichikawa | 362/308 |
| 4,310,773 | 1/1982 | Zukowski et al | 313/221 |
| 4,386,824 | 6/1983 | Draper | 362/346 X |
| 4,412,276 | 10/1983 | Blinow | 362/310 X |
| 4,792,717 | 12/1988 | Ferenc | 313/113 |

FOREIGN PATENT DOCUMENTS

| | | |
|---|---|---|
| 767519 | 2/1957 | United Kingdom |
| 1,289,841 | 9/1972 | United Kingdom |

OTHER PUBLICATIONS

G. E. Catalog, Nov. 1981 (front cover, p. 5, back cover).

G. E. Parabolic Trough Reflector Drawing dated 3/8/79

G. E. Fresnel lens drawing dated 2/21/79.

UNITED STATES PATENT AND TRADEMARK OFFICE
CERTIFICATE OF CORRECTION

PATENT NO. : B1 4,866,329
DATED : Issued: 11/12/91
INVENTOR(S) : Robert A. Ferenc It is certified that error appears in the above-identified patent and that said Letters Patent is hereby corrected as shown below:

Optical Textbook entitled "Optical Design of Reflectors," by William B. Elmer, c 1980, by John Wiley & Sons, Inc.

Magazine article entitled "New Developments in Electronic Flashtubes," by John H. Goncz of E. G. & G., Inc. dated 8/27/65, FIG. 8.

E. G. & G. Technical Data Sheet for Pi-shaped Xenon Flashtubes, dated 11/69.

Signed and Sealed this

Twenty-first Day of September, 1993

*Attest:*

BRUCE LEHMAN

*Attesting Officer*  *Commissioner of Patents and Trademarks*

REEXAMINATION CERTIFICATE (1588th)
United States Patent [19]
Ferenc

[11] B1 4,866,329
[45] Certificate Issued Nov. 12, 1991

[54] WIDE ANGLE WARNING LIGHT

[75] Inventor: Robert A. Ferenc, Middletown, Conn.

[73] Assignee: Whelen Technologies, Inc.

Reexamination Request:
No. 90/002,071, Jun. 29, 1990

Reexamination Certificate for:
Patent No.: 4,866,329
Issued: Sep. 12, 1989
Appl. No.: 239,203
Filed: Aug. 31, 1988

Related U.S. Application Data

[63] Continuation of Ser. No. 487,033, Apr. 21, 1983, Pat. No. 4,792,717.

[51] Int. Cl.⁵ .............................................. H01J 5/16
[52] U.S. Cl. ...................................... 313/113; 313/116; 362/308; 362/327; 362/346; 362/310
[58] Field of Search ............... 362/346, 349, 298, 300, 362/307, 310

[56] References Cited

U.S. PATENT DOCUMENTS

4,386,824 6/1983 Draper ............................ 362/346 X
4,412,276 10/1983 Blinow ............................ 362/310 X

*Primary Examiner*—Sandra L. O'Shea

[57] ABSTRACT

A compact, wide angle light comprising a concave reflector, lens and light emitter. The lens is provided with a plurality of light spreaders while the reflector is comprised of a linear section, with side walls interconnected by a parabolic section, disposed between dish end sections.

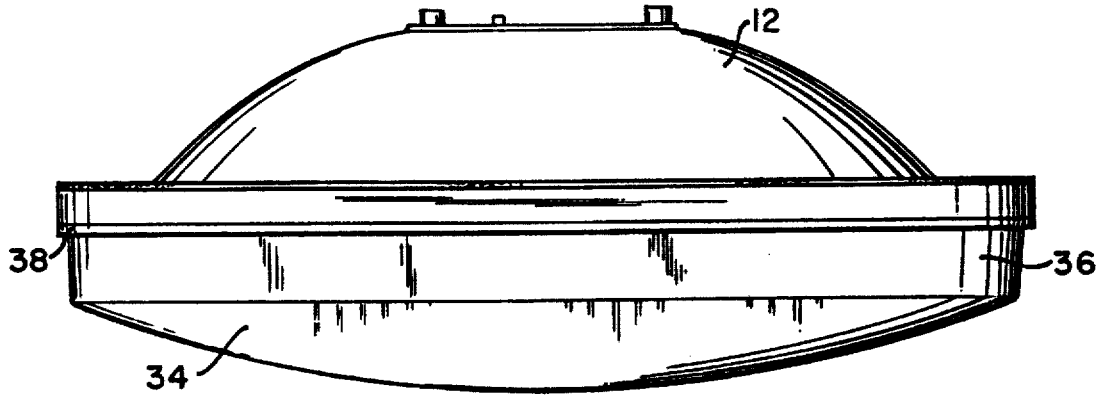

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-15 is confirmed.

* * * * *